United States Patent [19]

Chen

[11] Patent Number: 4,878,000

[45] Date of Patent: Oct. 31, 1989

[54] IMPROVED TRIGGER-TYPE CONTROL SWITCH FOR D.C. MOTORS

[76] Inventor: Shang-Hsieh Chen, 27 Chung Shan Rd., Sec. 3, Tantzu Hsiang, Taichung Hsien, Taiwan

[21] Appl. No.: 209,692

[22] Filed: Jun. 21, 1988

[51] Int. Cl.[4] ............................................. H02P 3/12
[52] U.S. Cl. .................................. 318/362; 200/1 R; 307/112
[58] Field of Search ............... 318/362; 307/125, 127, 307/112, 115; 200/1 R, 1 V, 49, 51 R, 51.05, 51.06

[56] References Cited

U.S. PATENT DOCUMENTS

| | | | |
|---|---|---|---|
| 4,459,522 | 7/1984 | Huber | 318/305 X |
| 4,588,910 | 5/1986 | Bausch | 200/1 X |
| 4,667,119 | 5/1987 | Holmes | 307/119 X |

FOREIGN PATENT DOCUMENTS 57-73420  5/1982  Japan .................................. 318/362

Primary Examiner—Bentsu Ro
Attorney, Agent, or Firm—David M. Ostfeld

[57] ABSTRACT

An improved triggering switch for DC motors having a base support, a pressing member operatively mounted over the base support, a coupling stand with an open section installed in an upper portion of the base support, a set of motor terminals and power source terminals combined with a contact shaft respectively disposed in the open section of the coupling stand, and a selection button adjustably installed at the base support and movably connected to the contact shaft. The improvement includes a braking member having an elongated terminal connected to a negative terminal of the motor terminals and a C-shaped contact portion formed at a rear end thereof fixedly disposed around the motor and the power source terminals in the open section of the coupling stand with the C-shaped contact portion being positioned in line with a rear end of a positive terminal of the motor terminals; thereby, when the contact shaft is moved back with the power source being cut off, the C-shaped contact portion and the positive terminal of the motor terminals will be connected by the contact shaft to short-circuit the motor and immediately stop it.

3 Claims, 10 Drawing Sheets

IMPROVED TRIGGER-TYPE CONTROL SWITCH FOR D.C. MOTORS

BACKGROUND OF THE INVENTION

This invention relates to a triggering switch, and more particularly to an improved triggering switch by which a running DC motor in an electrical appliance can be instantly stopped without race rotation when the power source is turned off.

Electrical motors have been widely used in most electrical appliances, particularly in that type of miniaturized electrical appliances used for manual operations such as electrical drills, grinding wheels, saws, etc.. Because the structure of these manual appliances is light and portable, and the DC motor installed therein is usually reversible. To operate the DC motor, these electrical appliances are normally provided with a triggering switch in the body structure. This known triggering switch, as shown in FIG. 1, is mainly composed of a base member 1, a pressing member 2, a contact shaft 3, a number of contacting terminals 4 and a selection button 5. During manual operation, pressing down the pressure member 2 causes the contact shaft to be moved forward to connect with the contacting terminals 4, the power thereof thus being turned on to start the motor (not shown) connected therewith. When the pressure is released from the pressure member 2, the contact shaft 3 will be moved backward to disconnect the contacting terminals 4, and the power thereof is thus turned off. The rotating direction of the motor can be changed by turning the selection button 5 to one side, thus turning the contact shaft to a certain degree, and pressing the pressing member 2. The motor will then rotate in a reverse direction because the polarity of the power supply is changed along with the turning of the contact shaft 3.

Although the structure of the conventional triggering switch, as shown in FIG. 1. is simple and the operation is convenient, it still suffers a problem, i.e. when the power is turned off, the motor and the motor shaft will not stop running until after a period of race rotation. Therefore, after the pressure released from the pressing member 2, the user has to keep on holding the tool and waiting until the motor has completely stopped rotating before putting it down or returning it to its original place. This inconvenient condition wastes much time and manpower in a factory assembly line, and often causes injury to human beings and damage to other articles close to it.

SUMMARY OF THE INVENTION

It is accordingly a primary object of the present invention to provide an improved triggering switch that overcomes the problem associated with the prior art.

This and other objects of the present invention are achieved by the provision of an improved triggering switch having a base support, a pressing member attached to the base support, a non-conductive coupling stand disposed in the upper portion of the base support, a set of motor terminals and power source terminals, together with a contact shaft respectively installed in an open section of the non-conductive coupling stand, and a selection button connected to the contact shaft. The improvement comprises a braking member made of a conductive material and including a C-shaped contact portion for being movably engaged with the contact shaft and an elongated terminal for being connected to a negative terminal of a DC motor so that when the pressure is released from the pressing member, the contact shaft will be moved backward to first cut off the power source, and then make a connection between the braking member and a positive terminal of the motor terminals so as to short-circuit the DC motor and effect a braking action to immediately stop the DC motor. Alternatively, the braking member can be integrally formed together with the negative terminal of the motor terminals so as to constitute a single unit for simplifying the structure of the triggering switch and achieve the same effect as described above.

Other advantages and characteristics of the present invention will become clear from the following detailed description of a preferred embodiment of an improved triggering switch when read in conjunction with the accompanying drawings.

DETAILED DESCRIPTION OF THE PREFERRED EMBODIMENT

Figure 1:
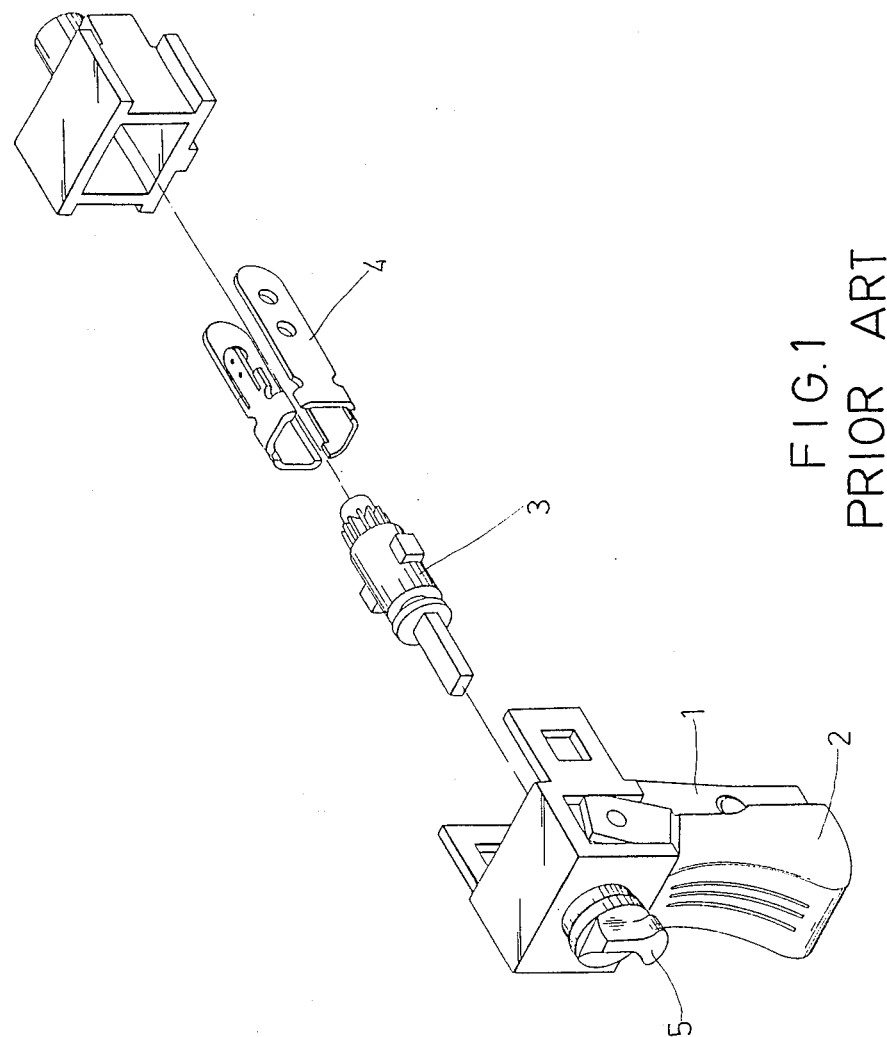
FIG. 1 is an exploded and perspective view of a known triggering switch.
Figure 2:
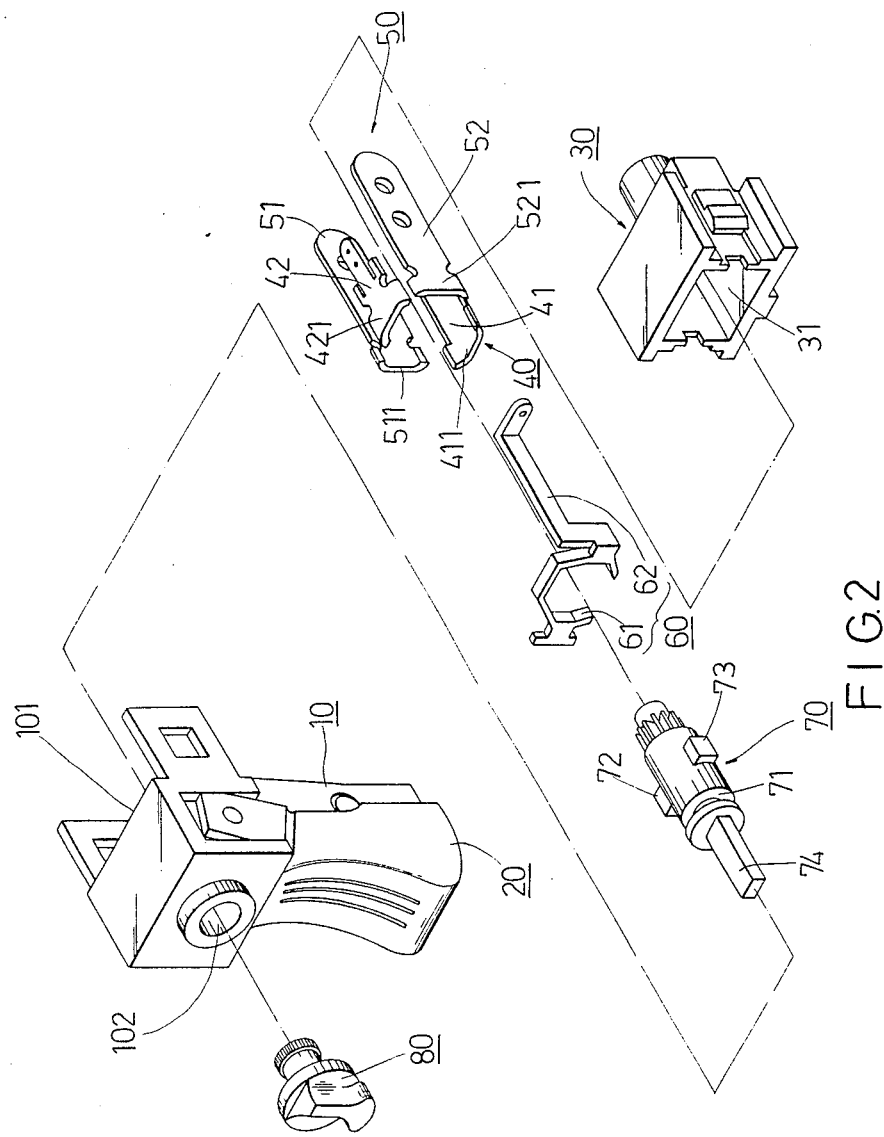
FIG. 2 is an exploded and perspective view of a preferred embodiment of an improved triggering switch according to the present invention.
Figure 3:
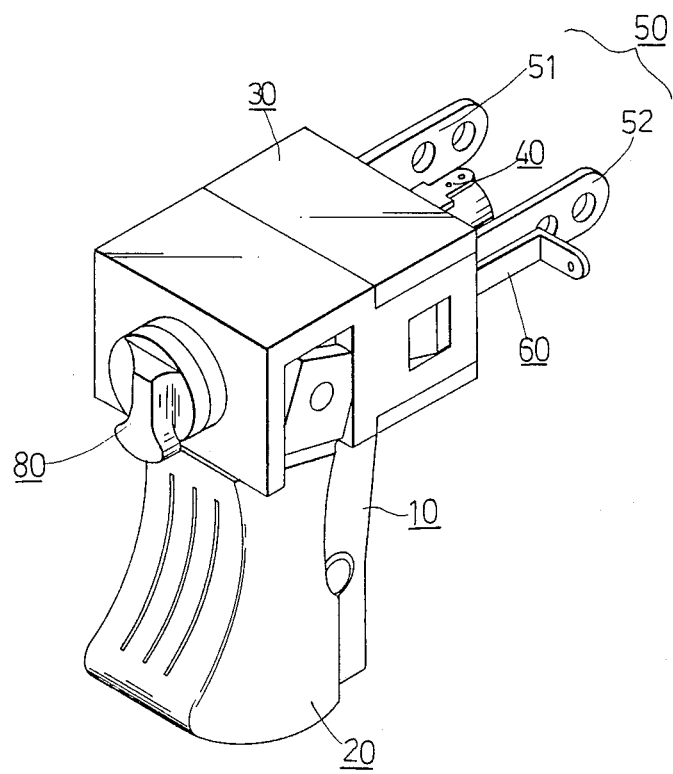
FIG. 3 is a perspective view of the preferred embodiment shown in an assembled condition.

Referring to FIGS. 2 and 3, the preferred embodiment of an improved triggering switch for DC motor-operated electrical appliances is composed of a base support 10, a pressing member 20, a non-conductive coupling stand 30, a pair of motor terminals 40 and a pair of power source terminals 50, a braking member 60, a contact shaft 70 and a selection button 80.

The base support 10 with a receiving chamber 101 in the upper front portion of an opening 102 in a back side of the receiving chamber is, as usual, adapted to sustain all other components for manual operations.

The pressing member 20 having a resilient element (not shown) disposed on the inner surface and a coupling ring (not shown) formed therein is movably connected to the base support 10 with the coupling ring being engaged around an annular groove 71 of the contact shaft 70, which is movably installed in the receiving chamber 101 of the base support 10.

The non-conductive coupling stand 30, which is integrally formed from bakelite material and has an open section 31 in the middle, is adapted to accommodate the contact shaft 70 to be moved back and forth in the open section 31, and is disposed in the receiving chamber 101 of the base support 10.

The motor terminals 40 having a positive terminal 41 connected to a positive terminal of a DC motor (not shown) and a negative terminal 42 connected to a negative terminal of the DC motor at each front end, and with each rear end of terminals 41 and 42 being formed in a U-shaped contact part 411, 421, and separately located in the open section 31 of the nonconductive coupling stand 30 wherein the U-shaped contact part 411 of the positive terminal 41 is longer than the U-shaped contact part 421 of the negative terminal 42 so as to be positioned in conjunction with the contact portion of the braking member 60.

The power source terminals 50 include a positive terminal 51 and a negative terminal 52 respectively connected to a positive terminal and a negative terminal (not shown) of a DC power source at each front end with the rear end of each terminal 51, 52 being formed in a U-shaped contact part 511, 521 and respectively positioned in the open section 31 of the non-conductive coupling stand 30.

The braking member 60 with an elongated terminal 62 at the front end and a C-shaped contact portion 61 at the rear end is made of a conductive material and is disposed in the open section 31 of the non-conductive coupling stand 30 for being connected to the negative terminal of the motor (usually the elongated terminal 62 is tapped at the negative terminal 42 of the motor terminals 40) wherein the C-shaped contact portion 61 and the U-shaped contact part 411 of the motor terminals 40 are located at the same level at which the front end of the contact shaft 70 can be passed through when the latter is pushed forward along with the operation of the pressing member 20.

The contact shaft 70, which is formed with an annular groove 71, a pair of contact point 72, 73 and a rectangular arm 74, is installed in the receiving chamber 101 with the rectangular arm 74 located in the opening 102 of the base support 10 for being movably connected to the selection button 80 and the annular groove 71 for being engaged with the coupling ring (not shown) of the pressing member 20. The front portion of the contact shaft 70 is situated in the open section 31 of the non-conductive coupling stand 30 and is adjacent to the locations of the U-shaped contact parts 411, 421, 511 and the C-shaped contact portion 61 so that different contacts can be selectively made through the contact points 72, 73 with the U-shaped contact parts 411, 421, 511 of the motor and power terminals 40 and 50 as well as the C-shaped contact portion 61 of the braking member 60 for effecting the clockwise and counterclockwise revolutions of the DC motor (it is to be noted that the contact points 72 and 73 are not connected with each other within the contact shaft 70).

The selective button 80 is movably installed in the opening 102 of the base support 10 and movably engaged with the rectangular arm 74 of the contact shaft 70 so that by turning the selecti button 80 left or right, the contact shaft 70 will also be turned left or right at certain degrees so as to change the rotation direction of the motor.

The combined preferred embodiment of the triggering switch according to this invention is as shown in FIG. 3 wherein the positive and negative terminals 51 and 52 of the power terminal 50 are symmetrically positioned at the left and right sides within the open section 31 of the coupling stand 30 while the positive and negative terminals 41 and 42 of the motor terminals 40 are separately disposed at the top and bottom sides in the open section 31 of the coupling stand 30. The C-shaped contact portion 61 of the braking member 60 is aligned with the U-shaped contact part 411 and located at an outer end of the open section 31 with the elongated terminal 62 being situated against the outer surface of the negative terminal 52. After the contact shaft 70 is movably installed in the open section 31 of the coupling stand 30, the contact points 71 and 72 can be slidingly kept in contact with the U-shaped contact parts 411, 421, 511 and 521 of the positive and negative terminals 41, 42 and 51, 52 of the motor terminals 40 and power source 50 in conjunction with the adjustment of the selective button 80. Operations of the preferred embodiment are detailed in the following paragraphs.

Under normal conditions, the positive and negative terminals of the DC motor (not shown) are separately connected to the positive terminal 41 and negative terminal 42, the positive and negative terminals of the power source (not shown) are respectively connected to the positive terminal 51 and negative terminal 52, and the brake mechanism 60 is coupled with the negative terminal of the DC motor (i.e. tapped at the negative terminal 42). Before operating the preferred embodiment, turn the selection button 80 to a position for setting the rotation direction of the DC motor, and then press the pressing member 20.

Figure 4A:
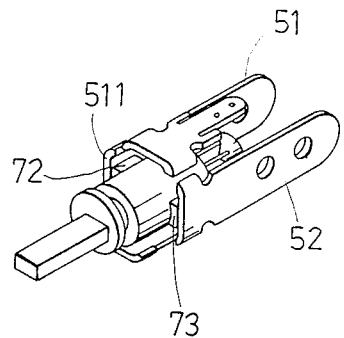
FIGS. 4A and 4B are illustrative views respectively showing the contacting conditions in locking the preferred embodiment.
Figure 4B:
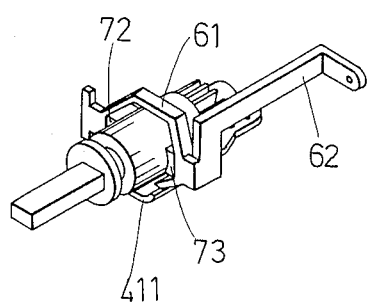
Figure 5:
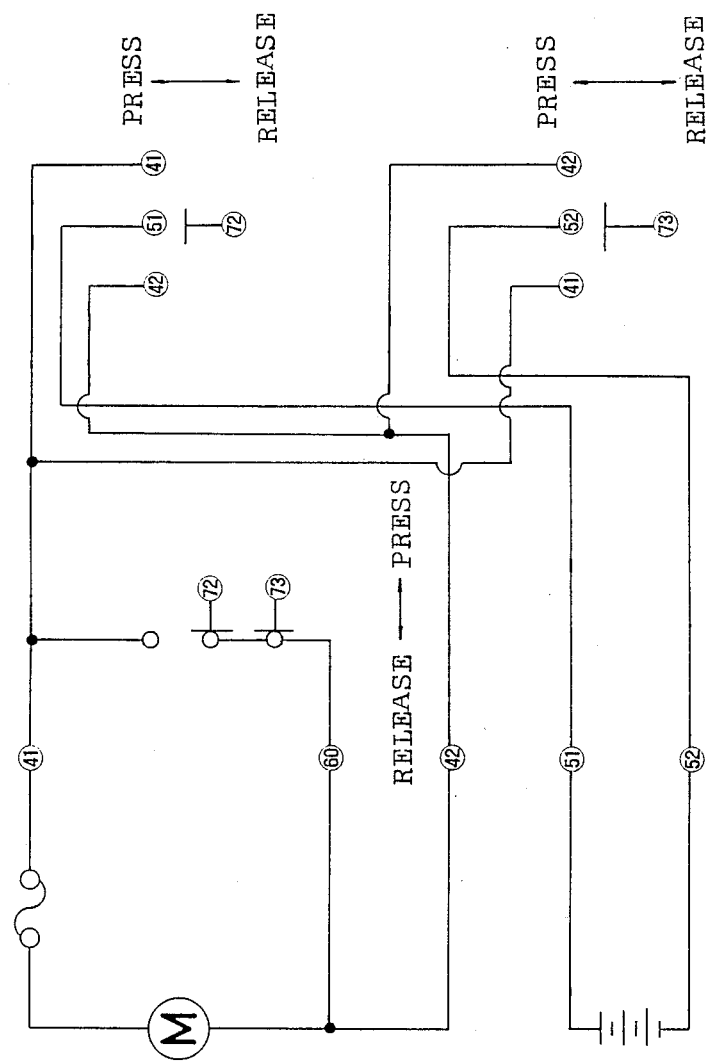
FIG. 5 is a circuit diagram showing the locked action of the preferred embodiment.

Referring to FIGS. 4 and 5, when the selection button 80 is turned to the middle position, the contact points 72 and 73 of the contact shaft 70 are kept at a level position. In this condition, when the pressing member 20 is pressed down, the contact shaft 70 will be pushed forward, and the contact points 72 and 73 are respectively engaged with the positive and negative terminals 51 and 52 of the power source 50 as shown in FIG. 4(A). Since the positive and negative terminals 41 and 42 of the motor terminals 40 are not connected with the power source terminals 50, the DC motor (not shown) will not be started. When the pressure applied to the pressing member 20 is released, the contact points 72 and 73 will be drawing back to be in contact with the S-shaped contact portion 61 of the braking member 60 as shown in FIG. 4(B). But, as the motor terminals 40 are still not connected to the power source terminals 50, the DC motor will remain off. Therefore, when the selection button is turned to its middle position, the preferred embodiment is in a locked condition, as shown in FIG. 5, and no operation can be performed.

Figure 6A:
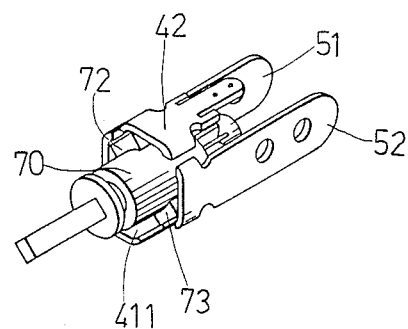
FIGS. 6(A) and 6(B) are illustrative views respectively showing the contact conditions to operate the preferred embodiment in clockwise rotation and stopping action.
Figure 6B:
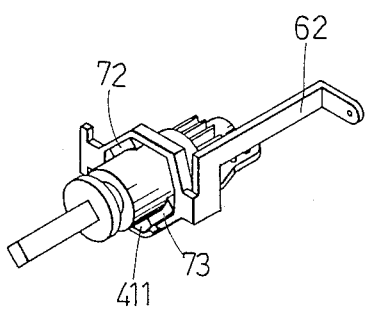
Figure 7:
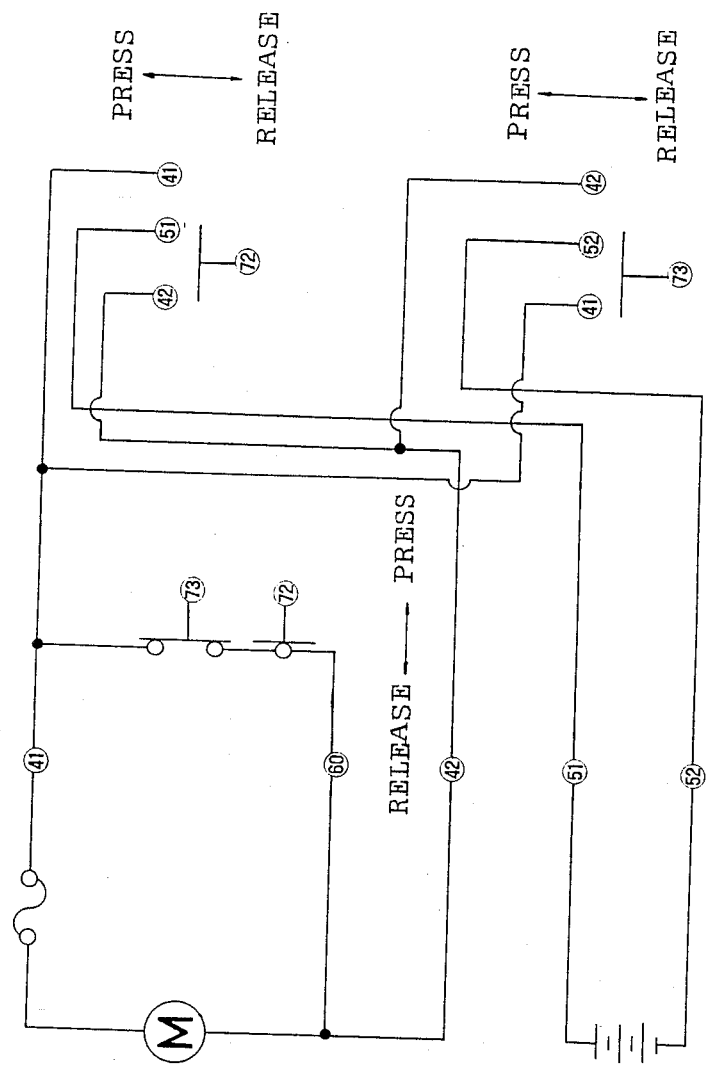
FIG. 7 is a circuit diagram of the preferred embodiment shown in FIGS. 6(A) and 6(B)

Referring to FIGS. 6 and 7, if the DC motor is to be operated in a clockwise rotation, just turn the selection button 80 clockwise 45 degrees. When the pressing member 20 is pressed down, the contact shaft 70 will be moved forward with the contact point 72 being connected to the negative terminal 42 (DC motor) and the positive terminal 51 (power source) and the contact point 73 being connected to the positive terminal 41 and the negative terminal 52, as shown in FIG. 6(A), and an electrical connection, as shown in FIG. 7, is thus constituted so that the DC motor starts to run in clockwise rotation. When the pressure applied to the pressing member 20 is released, the contact shaft 70 will be moved back to disengage first with the positive and negative terminals 51 and 52 of the power source terminals 50 so as to cut off the power source of the DC motor, but then engage with the positive and negative terminals 41 and 42 through the C-shaped contact portion 61 of the braking member 60, as shown in FIG. 6(B), so as to form a short circuit to the positive and negative terminals of the DC motor as shown in FIG. 7. As a result, a load in response to the current from the DC motor rotation will be produced and a brake force from the load will be immediately effected to stop the DC motor.

Figure 8A:
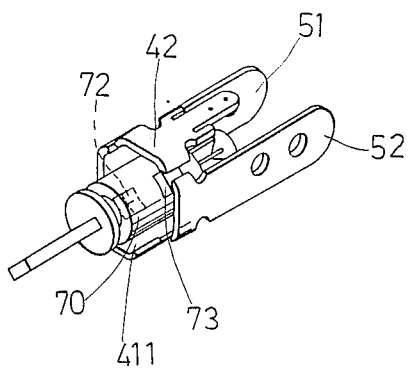
FIGS. 8(A) and 8(B) are illustrative views respectively indicating the contact conditions of the preferred embodiment in counterclockwise rotation and stopping action.
Figure 8B:
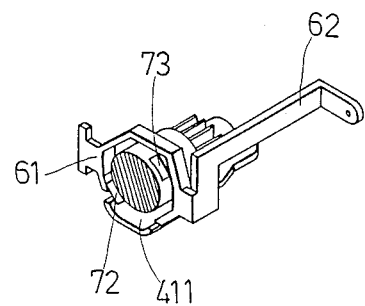
Figure 9:
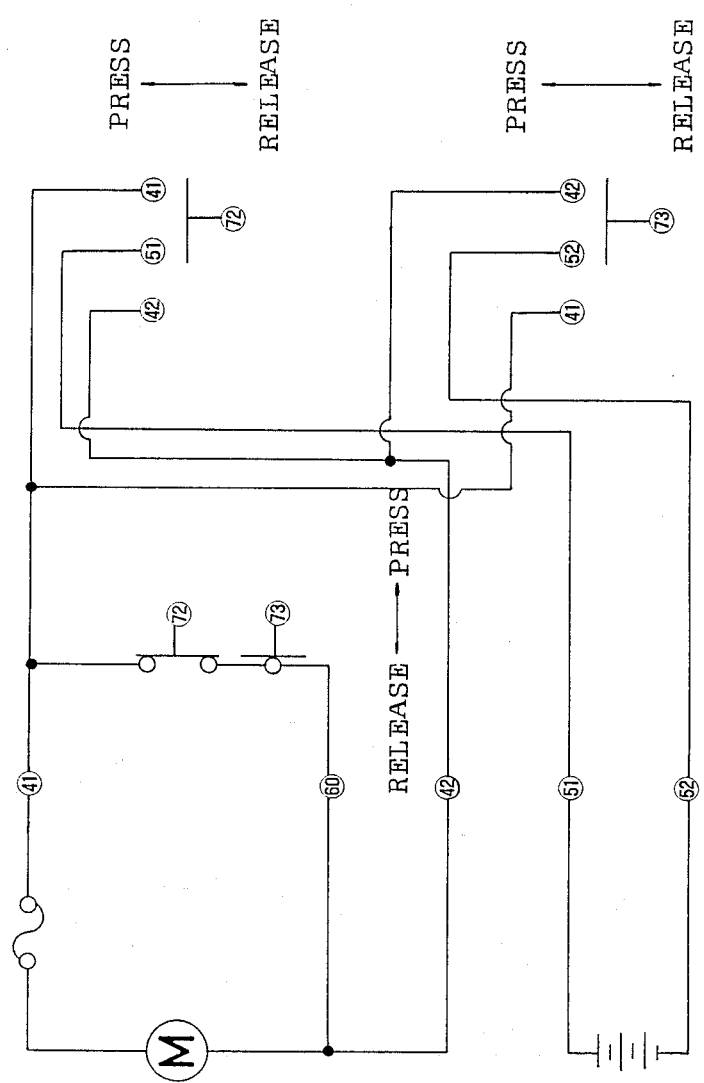
FIG. 9 is a circuit diagram of the preferred embodiment shown in FIGS. 8(A) and 8(B)

Referring to FIGS. 8 and 9, when the DC motor is to be operated in a counterclockwise rotation, just turn the selection button 80 counterclockwise 45 degrees. in this condition, when the pressing member 20 is pressed down, the contact shaft 70 will be moved forward with the contact point 72 being connected to both positive terminals 41 (DC motor) and 51 (power source) and the contact point 73 being connected to both negative terminals 42 (DC motor) and 52 (power source), as shown in FIG. 8(A), and an electrical connection is thus constituted, as shown in FIG. 9, so that the DC motor is started to run in a counterclockwise rotation. When the pressure applied to the pressing member 20 is released, the contact shaft 70 will be moved back, with the contact points 72 and 73 being disengaged from the power source terminals 50 so as to cut off the power source therefrom, but the contact point 73 is engaged with the positive terminal 41 and the braking member 60 (which is connected to the negative terminal 42), causing a short circuit to the DC motor and producing a load for immediately stopping the DC motor.

Figure 10:
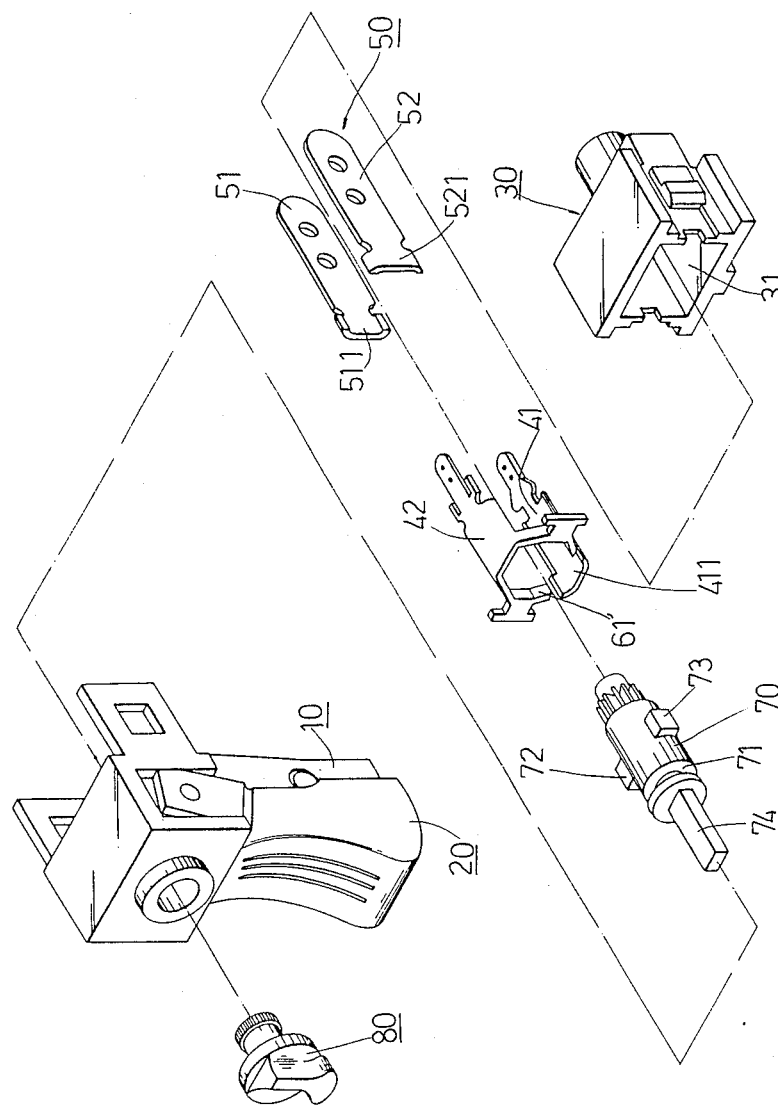
FIG. 10 is an exploded and perspective view illustrating an alternative example of the preferred embodiment.

Referring to FIG. 10, since the braking member 60 is always connected to the negative terminal 42 of the motor terminals 40, an alternative example of the braking member 60 and the negative terminal 42 can be integrally formed as a single unit. As shown in FIG. 10, the negative terminal 42 of the motor terminals 40 includes a C-shaped contact portion 61' which is located opposite to the U-shaped contact part 411, both of which are positioned at the rear end portion of the coupling stand 30 for being movably connected with the contact points 72 and 73 of the contact shaft 70 in effecting a short circuit and instantly stopping the DC motor therewith.

While I have illustrated and described my invention by means of specific embodiments, it is to be understood that numerous changes and modifications may be made therein without departing from the spirit and scope of the invention as defined in the appending claims.

What I claim is:

1. An improved triggering switch having a base support, a pressing member operatively attached to the base support, a non-conductive coupling stand with an open section disposed in an upper portion of the base support, a set of DC motor and power source terminals combined with a contact shaft installed in the open section of the coupling stand, and a selection button adjustably installed on the base support and movably coupled with the contact shaft, comprising:

a braking means made of conductive material and including an elongated terminal portion connected to a negative terminal of the motor terminals and a C-shaped contact portion disposed at a rear end of the coupling stand and aligned with a rear end of a positive motor terminal; so that, when the contact shaft is moved backward with the power source of the DC motor being turned off, a pair of contact points of the contact shaft will be connected between said C-shaped contact portion of said braking means and the positive motor terminal so as to short-circuit the motor terminals and effect an immediate stop to the DC motor.

2. In an improved triggering switch of the type having a base support, a pressing member operatively attached to the base support, a non-conductive coupling stand with an open section disposed in an upper portion of the base support, a set of motor terminals and power source terminals, together with a contact shaft, installed in the open section of the coupling stand, and a selection button adjustably disposed on the upper portion of the base support and movably engaged with the contact shaft, the improvement comprising a braking means integrally formed together with a negative terminal of the motor terminals for being connected to a positive terminal of the motor terminals through a backward movement of the contact shaft so as to cause a short-circuit to the motor terminals and effect an immediate stop of the motor.

3. The improved triggering switch according to Claim 2 wherein said braking means comprises a C-shaped contact portion integrally formed at a rear end of the negative terminal of said motor terminals and positioned in line with a rear end of the positive terminal of said motor terminals so as to short-circuit the connection therewith.

* * * * *